US005461794A

United States Patent [19]

Huang

[11] Patent Number: 5,461,794
[45] Date of Patent: Oct. 31, 1995

[54] MOVABLE TYPE MEASUREMENT SCALE AT VARIABLE ANGLES

[76] Inventor: Jui L. Huang, No. 303, Tai Ming Rd., Wu Jih Hsiang, Taichung Hsien, Taiwan

[21] Appl. No.: 149,656

[22] Filed: Nov. 9, 1993

[51] Int. Cl.⁶ ............................................. B43L 7/10
[52] U.S. Cl. ............................ 33/470; 33/456; 33/418; 33/419; 33/424
[58] Field of Search ............... 33/418–422, 424–427, 33/452, 456, 459, 460, 464, 465, 468–473, 562

[56] References Cited

U.S. PATENT DOCUMENTS

| | | | |
|---|---|---|---|
| 71,595 | 12/1867 | Evans | 33/419 |
| 143,595 | 10/1873 | Shoff | 33/470 |
| 418,256 | 12/1889 | Werts | 33/456 |
| 905,249 | 12/1908 | Townsend | 33/470 |
| 912,605 | 2/1909 | Osmonson | 33/456 |
| 1,015,773 | 1/1912 | Auger | 33/456 |
| 1,632,267 | 6/1927 | Beem | 33/473 |
| 5,205,045 | 4/1993 | Liu | 33/468 |

FOREIGN PATENT DOCUMENTS 109044  4/1899  Germany ....................... 33/420

Primary Examiner—William A. Cuchlinski, Jr.
Assistant Examiner—G. Bradley Bennett
Attorney, Agent, or Firm—McGlew and Tuttle

[57] ABSTRACT

The present invention relates to a kind of movable device which varies at any angle to serve as measurement ruler, and more particularly to an improved structure of measurement ruler with multiple functions in use. The ruler's main body is L shaped with engraved number of degrees on both sides, one side with sliding channel and a sliding through installed at the lower end of the sliding channel, which is wider in breadth than the channel, one measurement ruler like a straight stick with engraved numbers in degrees, one end of which is in conical shape and the other end of which at the top there installs a sign index with a conical peeping hole and a set of installation holes, one scale ruler in semicircular shape with sliding block in consecutive form. Under it, there is sliding column on which there are threaded lines. AT the front end, there in an assembly hole. The semicircular body is engraved with the degrees in angle.

4 Claims, 9 Drawing Sheets

MOVABLE TYPE MEASUREMENT SCALE AT VARIABLE ANGLES

FIELD OF THE INVENTION

The present invention relates to a brand new ruler with movable elements, which can be varied at any angle for measurement, and more particularly to an improved structure of a ruler with multiple purposes in practical use.

BACKGROUND OF THE INVENTION

The proposed structure mainly includes its one main body, a strip of material with straight edges and a measurement scale that is marked off in units as well as auxiliary component parts in relation to it which provides various different measurement functions.

Although there are many kinds of measurement rulers available on the market, their usage is primarily limited to the ability to make lines or to measure a thing's size or angle. These rulers are made up in many shapes or even fanciful types. Such rulers often lack useful and practical features. The present invention provides significant improvements to the ruler's measurement performance and other functions, to provide an ideal tool for any user.

DETAILED DESCRIPTION OF THE PREFERRED EMBODIMENT

Figures 1A, 1B, 1C:
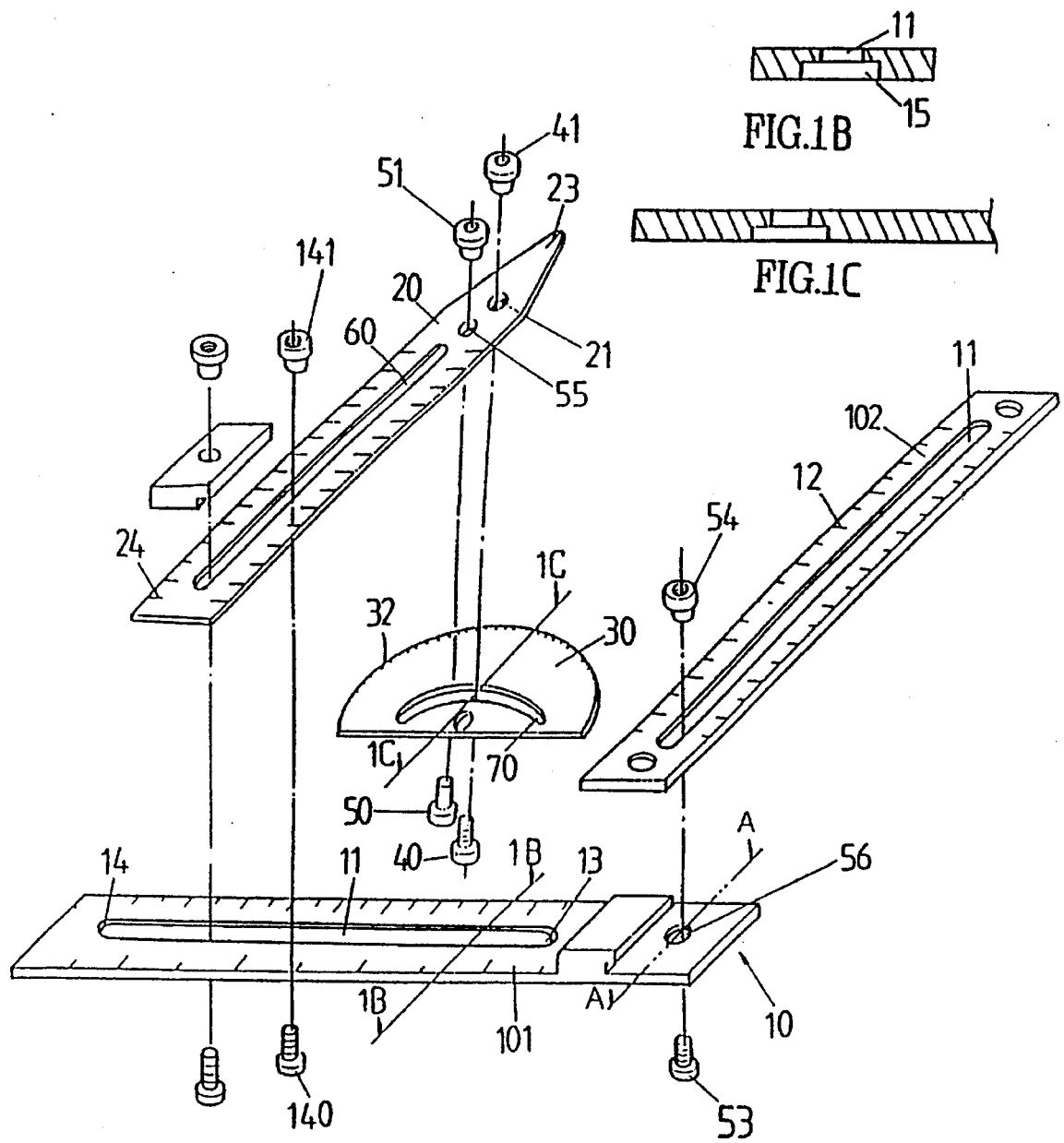
FIG. 1A is an exploded view of the device of the present invention.
FIG. 1B is a cross sectional view taken along the line 1B—1B in FIG. 1A.
FIG. 1C is a sectional line taken along the view line 1C—1C in FIG. 1A.

In reference to FIG. 1, the Figure shows a general view of the components of the present invention.

The ruler includes a main body 10 which is "L" shaped, composed of first main body part 101 and second main body part 102. Inscribed grades in units are shown 12, provided on both sides of each body part 101, 102. Each part, 101 and 102 is provided with a sliding channel 11. Please refer to FIG. 1B. At a lower end of the sliding channel 11, there opens a sliding groove 15 of a wider breadth. The sliding channel 11 ends at half arc-shaped end parts 13 and 14. A measurement ruler 20 is provided with a central sliding groove 60. One end of the measurement ruler has a conical shape portion. A sign index 23 is provided centered on a conical tip of the conical shape portion. An assembly hole 21 is also provided at the conical shape portion. On both sides of ruler 20, units 24 are engraved. A scale ruler 30 is provided in the form of a semi-circular body. An arc shape slot 70 is formed through the ruler 30. Please refer to FIG. 1C. Angular degrees are inscribed adjacent to its outer periphery. One screw 40 with nut 41 fixes ruler 30 via holes 21 and slot 70 to ruler 20.

Figure 2:
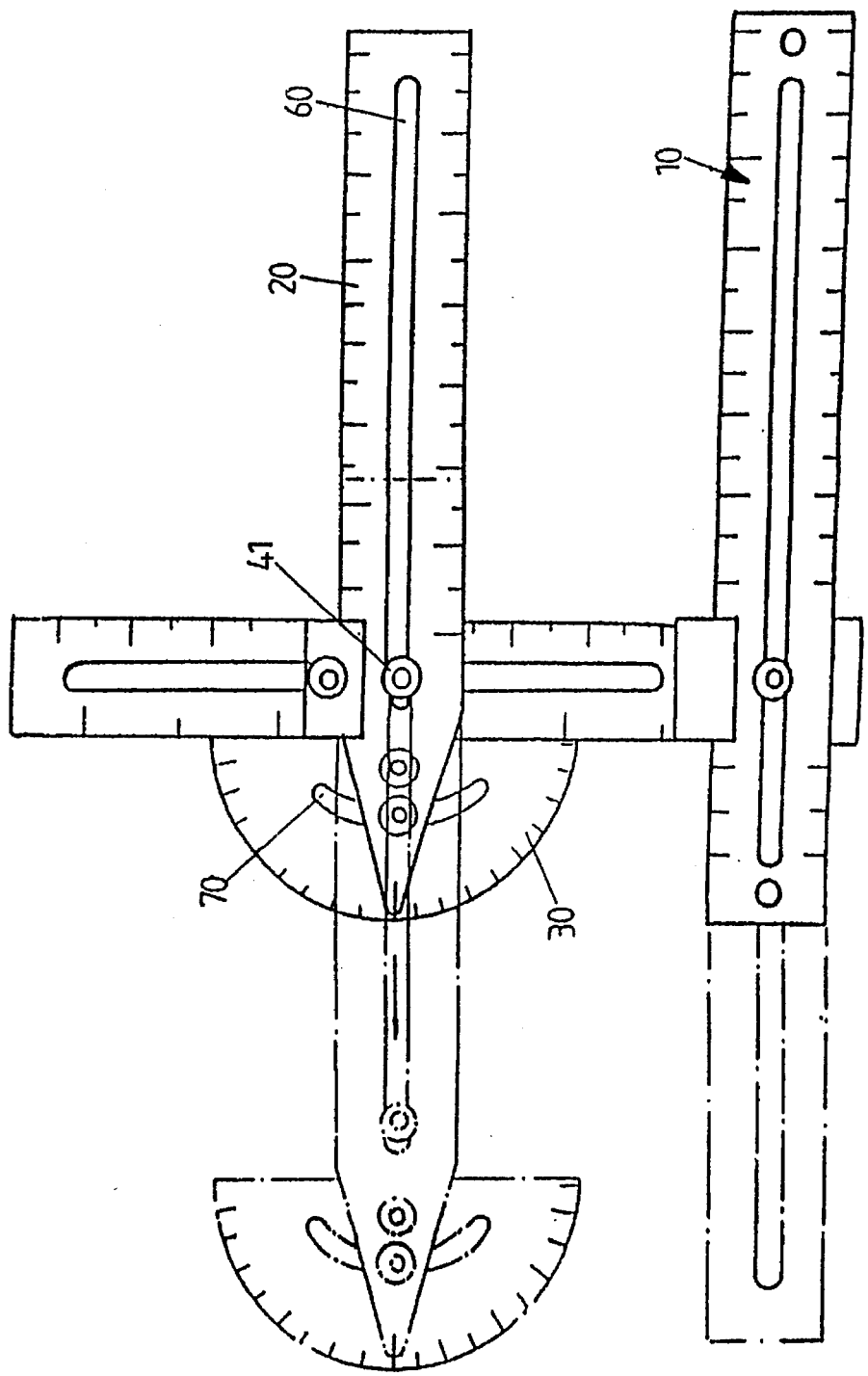
FIG. 2 is an ideal sketch in alignment.

Please refer to FIG. 2, which shows the device in an assembled state.

After the assembly hole 21 and turning slot 70 are aligned, screw 40 in coordination with the nut 41 locks the measurement rule and engraved scale 30 together in union. Further, the measurement rule may use a second screw and nut assembly 50 and 51 in a pivot hole 55 as its axis so that it may turn around at will an arc angle. The assembled ruler 20 and the scale ruler 30 are placed over the ruler's main body 10, and with the operation of screw 140 and nut 141 locked up in the sliding groove 15, they may move with in the sliding groove 15.

Figure 3:
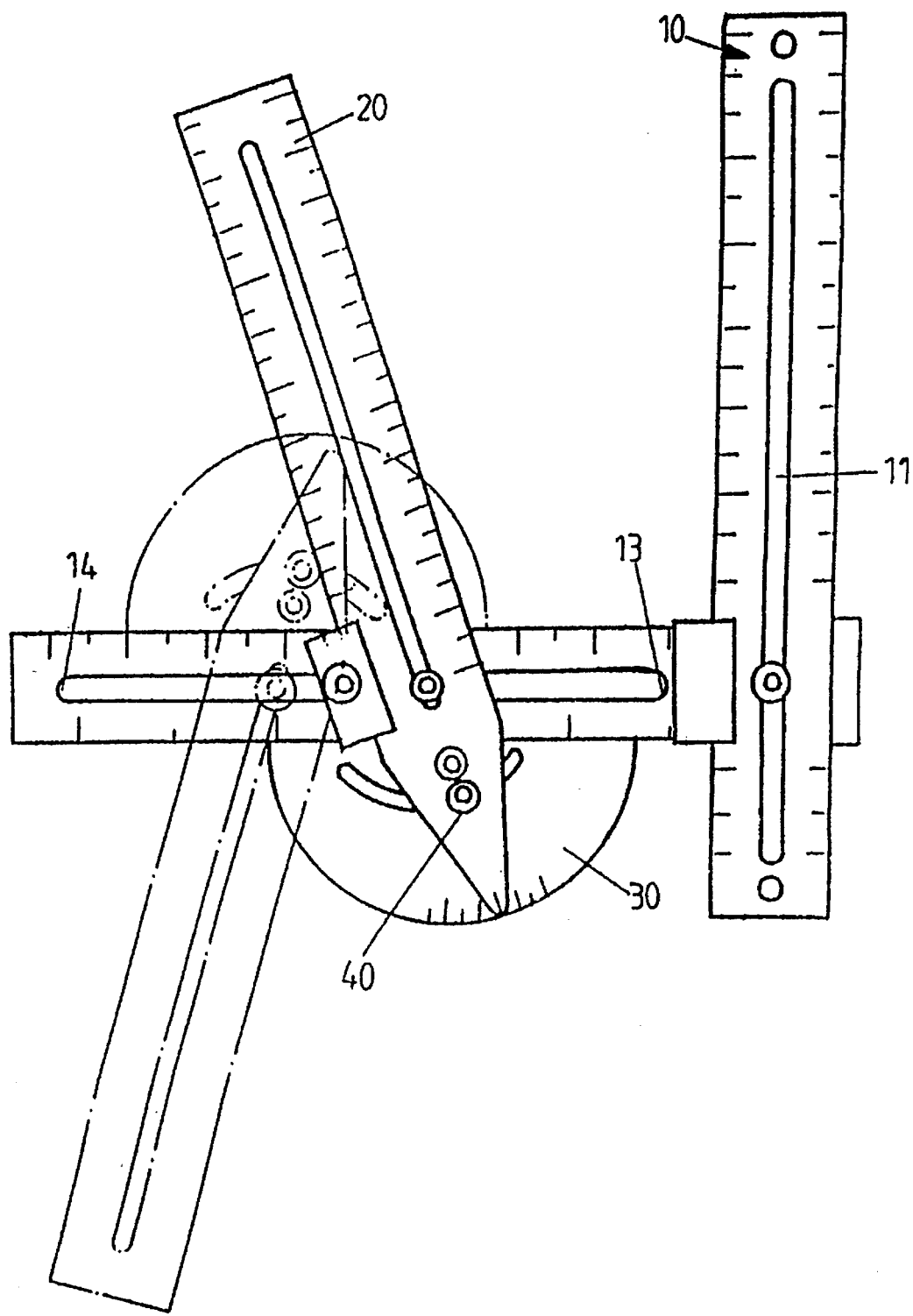
FIGS. 3 and 4 are the better examples in the present invention.

Please refer to FIG. 3, which shows an example of use of the present invention.

The measurement ruler 20 in the present invention may take one of the set of screws as its axis to turn to the degrees in which the drawing can be made for a desired line. Then the scale ruler 30 is moved up to the end of the sliding channel 11, and it turns to pass by the half arc-shaped end parts 13, 14 and to reach the outside of the ruler's main body 10. At this point, one may draw a line opposite to the contained angle with the same degrees in angle. Then it may pass by the turning position of the displacement half arc-shaped end part 13 to reach the degrees in inner and outer angles for drawing purpose. Besides, the left and right sides can be used for drawing lines or measurement of degrees in angle.

Figure 4:
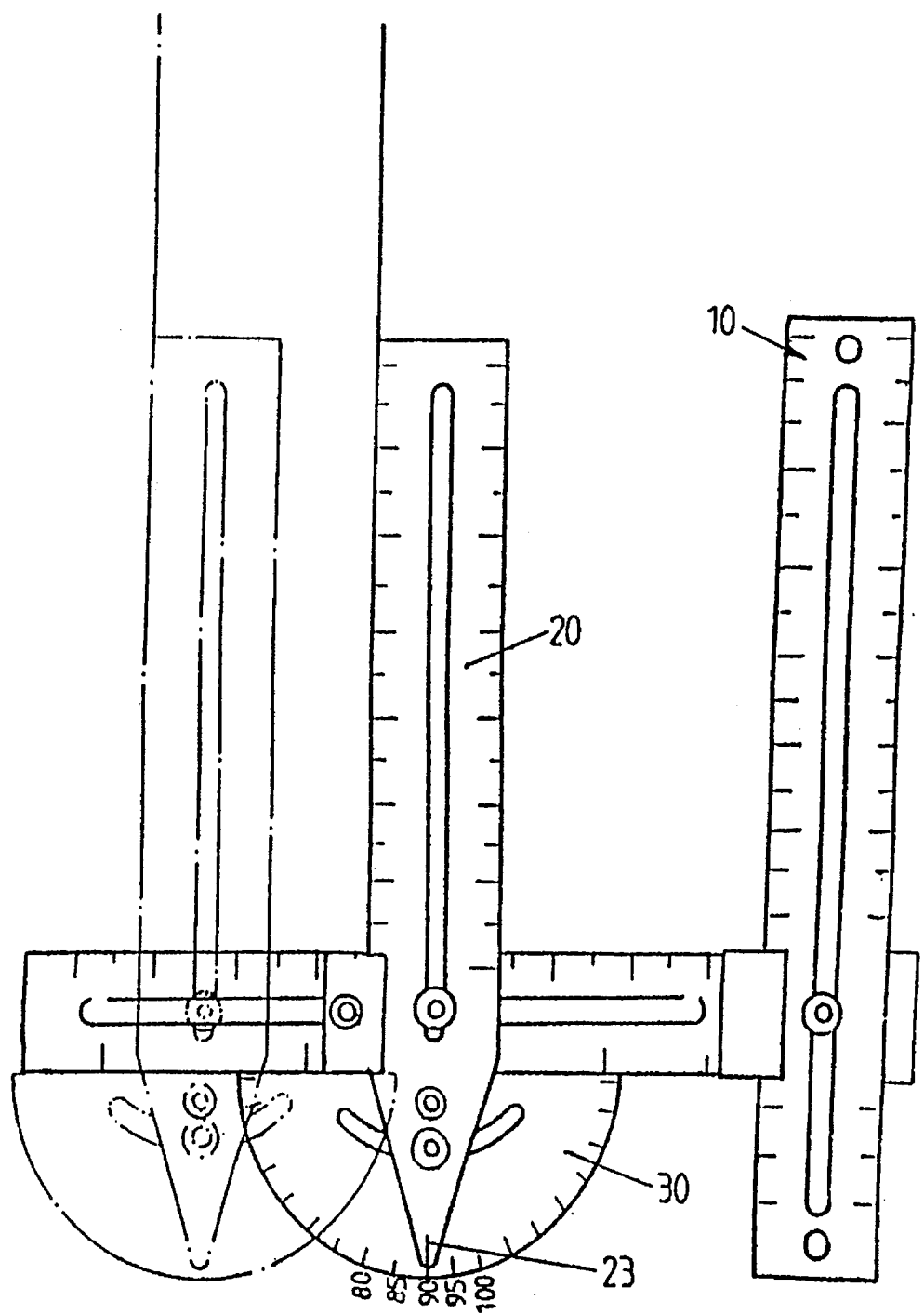

Please refer to FIG. 4 for a further example of use of the present invention.

Using one side of the ruler's main body 10 as the standard line, one may return the sign index 23 on the measurement ruler 20 to the 90 degree mark in the center of the scale ruler 30 to make the measurement ruler 20 parallel with one side of the ruler's main body 10. Then one may move the scale ruler 30 as a means for making parallel lines.

Figure 5:
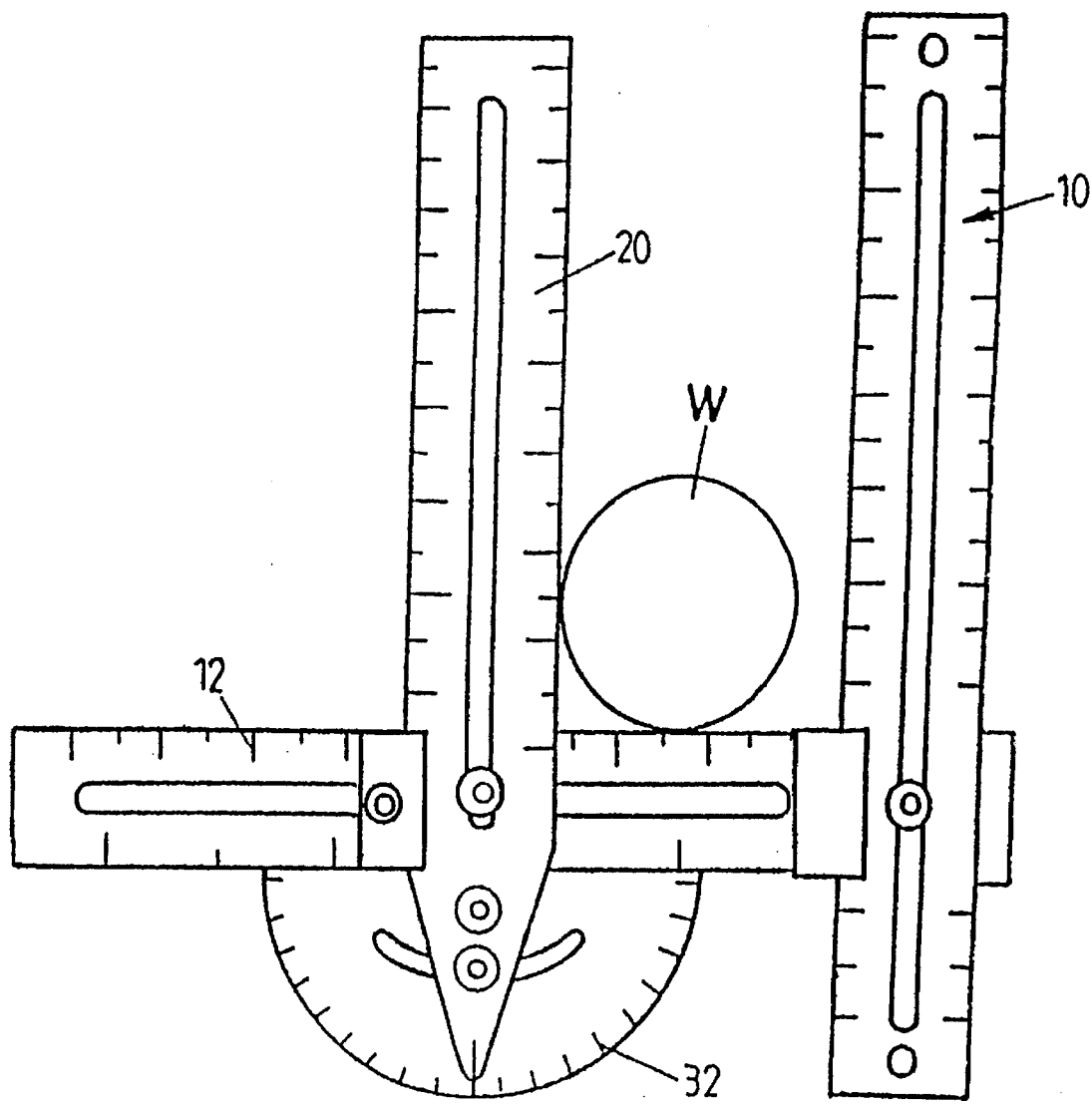
FIGS. 5, 6 and 7 are the better examples in use of the present invention.

Please refer to FIG. 5 which shows a further example of the application of the present invention.

If one is prepared to measure the contour of a circle, he (she) may place the circular object over the inner right angle's side of the ruler's main body 10 to let the circular object to keep firmly and exactly to the side of the right angle. Then one may again place the measurement ruler 20 bordering on the other circular side of the circular object w to make the three circles of the circular object to be in neighborhood of the ruler's main body 10 whereby one may look at the inscribed degrees on the surface of the ruler's main body 10 to know the actual diameter of the circular object W. The inscribed degrees 12 can be noted to provide a diameter measurement.

Figure 6:
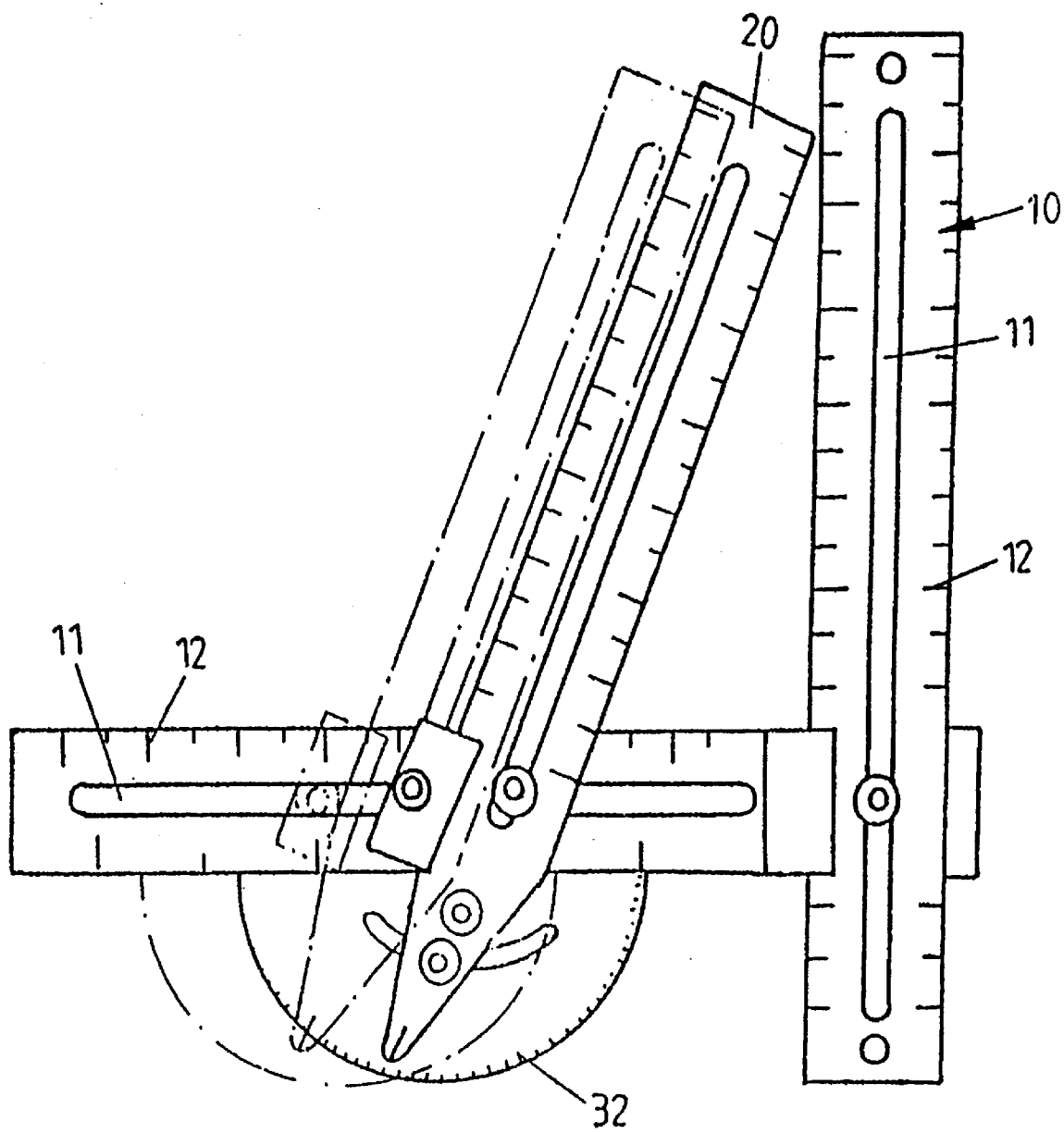

Please refer to FIG. 6 for a further example of use of the present invention.

If one wants to draw triangles of different sizes, he (she) may turn the measurement ruler 20 to the angle degrees of the contained angle in the triangle. At first, the triangle of small size is drawn up. Then one may slide it upward to the larger size at the same degree in angle. As the angle degree remains the same, only the size of the triangle is enlarged. Therefore, by means of the sliding in the sliding channel and aiming at the correct engraved degree number 12, one is able to draw either a larger or small triangle.

Figure 7:
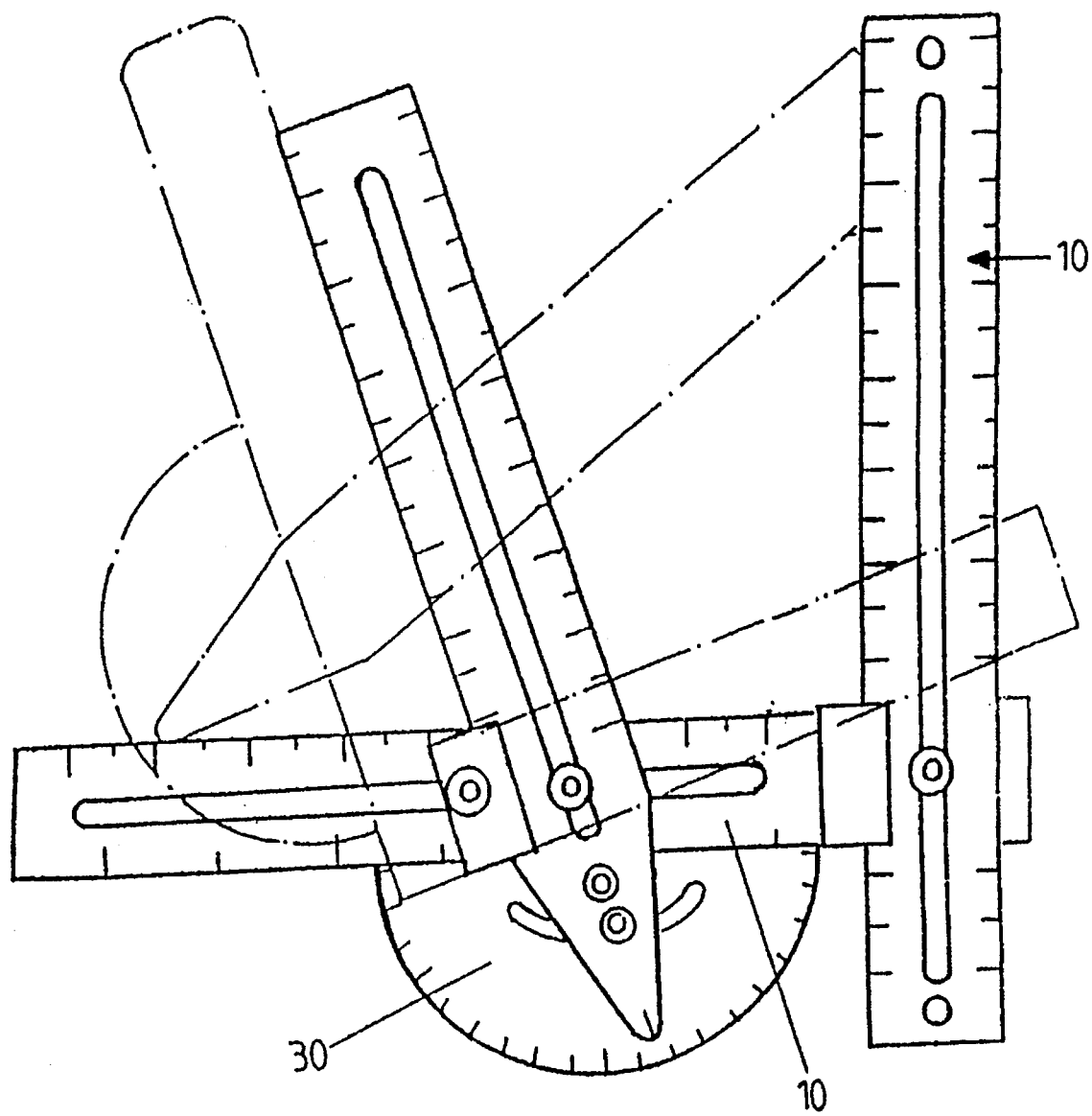

Please refer to FIG. 7 which shows a further example of use with regard to the present invention. The present invention may also apply to the drawing of polygon. To take the pentagon as an example, the inner angle of each side is 108 degrees. At first, the scale ruler 30 is adjusted to 108° in the fixed position. Then one may take one side of the ruler's main body as the standard line to draw up the two lines of the contained angle at 108°. Then one may take the second standard line to serve as the basis for making a drawing again. Similarly, one may draw up the third standard line and so on. One may apply the same principle to draw up the shape or angle of a pentagon. One shall use the internal angle of a right triangle at 60°. The quarangle at 90°, hexagon at 120° etc. All of the polygons can be drawn up with the present invention.

Figure 8:
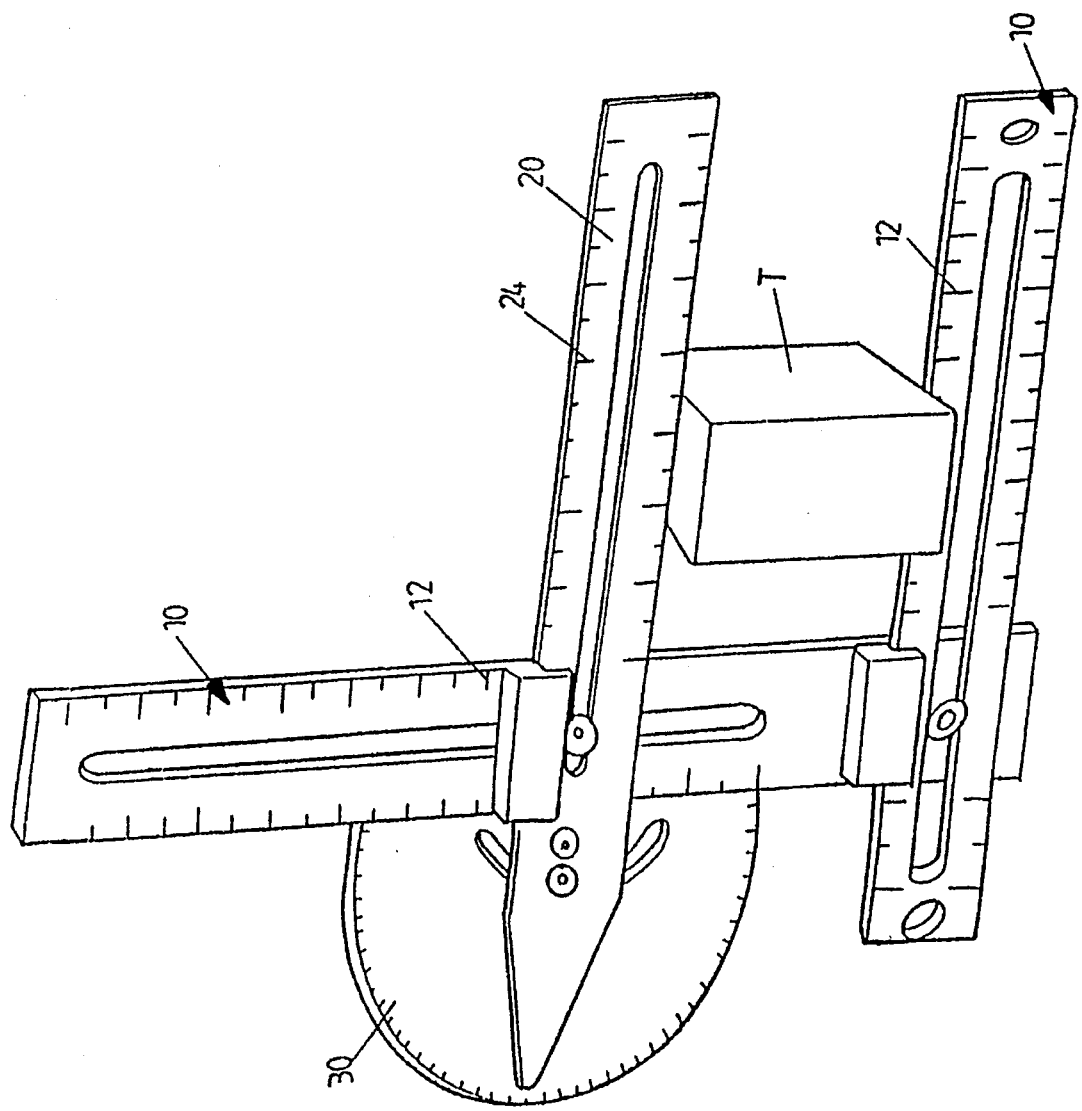
FIGS. 8 and 9 are the better examples in use of the present invention.

Please refer to FIG. 8 for a further example with the use of the present invention.

The present invention may also measure the height, width and depth of a solid object. For the method in using the scale ruler, one at first turns the scale ruler to the inner side of the ruler's main body 10. Then place the ruler's main body 10 and tile object to be measured on the same plane. The object T to be measured is placed to keep it close to the side of the ruler's main body. The measurement scale 20 is then placed bordering on the object T to be measured so as to enable one to observe the actual size of the object T (the observer looks at the engraved number of degrees on the scale surface ill respect to the height, width and depth of the object T).

Figure 9:
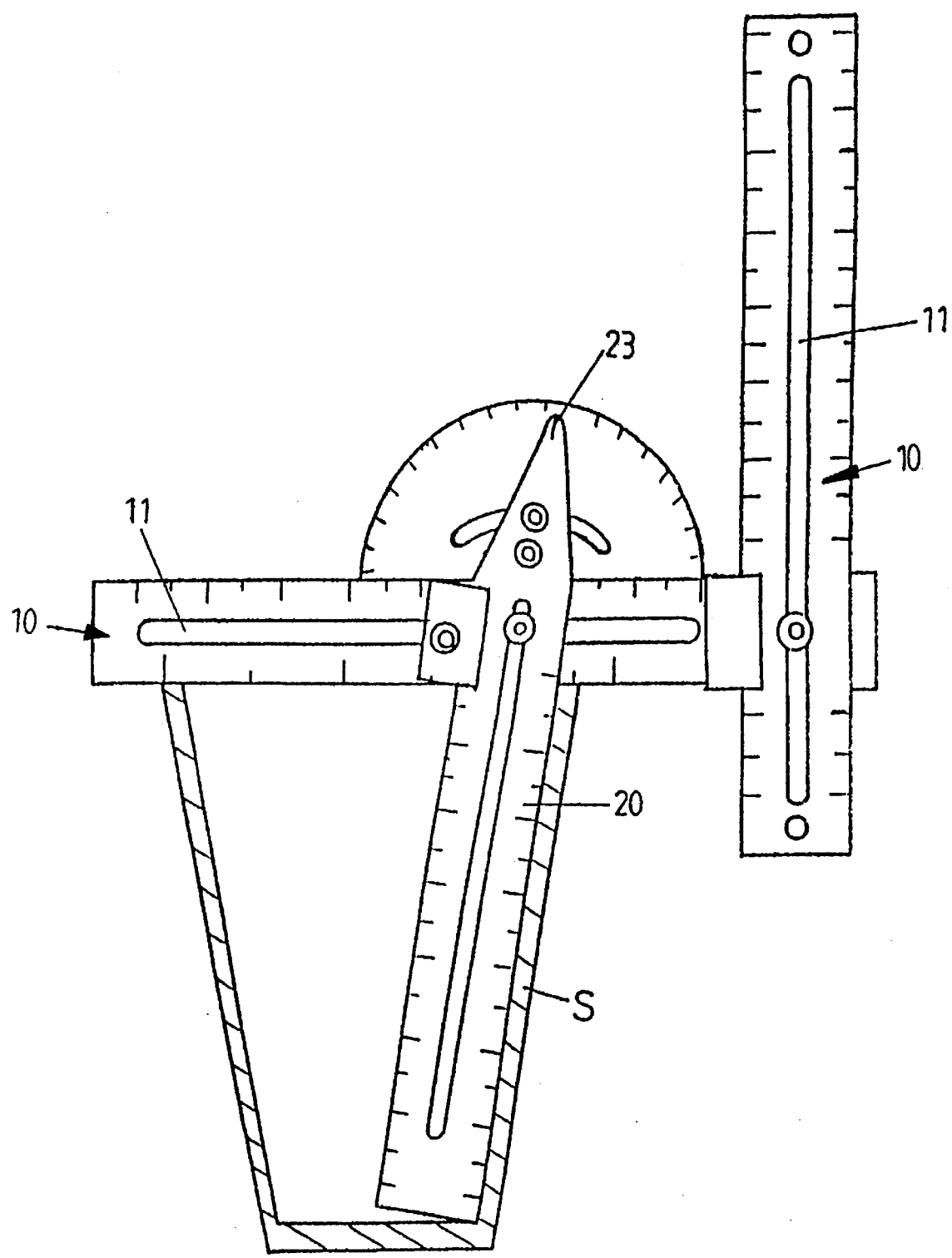

Please refer to FIG. 9 for a further example of the use of the present invention.

If one needs to measure the contained angle of the object S, one may insert the measurement ruler 20 deep into the object S, and slide it in the sliding channel 11. Put the measurement ruler so attached to the side of the object S. Following the guidance of the sign index 23, one may observe the number of degrees of the inner angle of the object S through the peeping hole 22.

Further, the present invention may also apply to the (dotted line) as shown in FIG. 2. The measurement ruler 20 and scale ruler 30 may be extended. Or the bias angle can be made into the observation angle and drawing angle to meet the situation. Of course, the scale ruler 20 may be taken off the main body 10 to make the scale ruler and measurement ruler 20 to exactly form the semblance of T square which can perform the function of T square. Besides, with an additional screw 53 and nut 54 assembly and a through hole 56 in the first main body 101, the present invention may be transformed into T square which is adjustable from square, having the functions in adjustment and the set-up of angles.

By means of the above examples, in practical use, we understand the advantages of the present invention as follows:

There are numerous advantages to count such as the drawing, lines, contained angles, the adjustment and measurement of angles and the measurement of tangible object. The special features are as follows: (1) Measuring the inner and outer angles, and measuring from both sides of an angle P. (2) Parallel lines can be drawn up from the left and right sides. (3) Measure the outer diameter of the round body. (4) Drawing and preparing triangles of different sizes, either large or small ones directly. (5) Making polygons with sides of the same length or unequal length. (6) Measuring the length, width and height of the solid object. (7) Measuring inner contained angles. Of them, the drawing and measurement of the solid object and polygons are often considered to be common and conventional practice which can only be done by the ruler with multiple functions.

I claim:

1. A ruled instrument, comprising:

a main body formed of a first main body part and a second main body part, said first main body part and said second main body part being connected to form substantially an L shape;

a through slot provided in said first main body part, said through slot having a lower side forming a sliding groove;

a measurement ruler having a through slot;

a screw and nut assembly including a screw part passing through said through slot of said measurement ruler and through said through slot of said first main body part to connect said measurement ruler to said first main body part, said nut being retained within said sliding groove;

a scale ruler having a semi-circular body, said scale ruler having an arc-shaped slot with a sliding groove formed on a lower surface of said scale ruler, said scale ruler sliding groove having an arc shape cooperating with said arc-shaped slot, said measurement ruler having a hole on an end thereof;

a second screw and nut assembly including a second screw passing through said hole of said measurement ruler and passing through said arc-shaped slot and said arc-shaped sliding groove and a second nut, said second nut being retained within said arc-shaped sliding groove, for fixing said scale ruler to an end of said measurement ruler.

2. An instrument according to claim 1, wherein:

said scale ruler is further connected to said measurement ruler via a pivot hole formed in said scale ruler and a pivot hole formed in said measurement ruler, said scale ruler pivot hole being positioned spaced from said arc-shaped slot for allowing pivotable movement of said scale ruler with respect to an end of said measurement ruler with said second screw sliding within said arc-shaped slot and said second nut sliding within said arc-shaped sliding groove.

3. An instrument according to claim 2, wherein:

said scale ruler includes angled degree marks provided adjacent a peripheral edge of said scale ruler, said measurement ruler having a conical part at said end, said conical part having a index mark for determining an angle of said measurement ruler with respect to said first main body part.

4. An instrument according to claim 1, wherein:

said second main body part includes a slot and said first main body part includes a through hole on an end thereof, an additional screw and nut assembly being provided connecting said first main body part to said second main body part, allowing said second main body part to be moved relative to said first main body part allowing said main body part to change from an L-shape to a T-shape.

\* \* \* \* \*

UNITED STATES PATENT AND TRADEMARK OFFICE
CERTIFICATE OF CORRECTION

PATENT NO. : 5,461,794
DATED : October 31, 1995
INVENTOR(S) : Jui Li Huang

It is certified that error appears in the above-indentified patent and that said Letters Patent is hereby corrected as shown below:

On the Title page, please add the assignee data as follows:
 [73] Assignee: Chang Feng Chang, Taichung, Taiwan, R.O.C., Chang Ding Hsi, Changhua Hsien, Taiwan, R.O.C.

Signed and Sealed this

First Day of October, 1996

Attest:

BRUCE LEHMAN

*Attesting Officer*          *Commissioner of Patents and Trademarks*